United States Patent [19]

Runyon

[11] Patent Number: 5,314,619
[45] Date of Patent: May 24, 1994

[54] METHOD AND APPARATUS FOR POND WATER CLARIFICATION AND MAINTENANCE

[75] Inventor: Larry Runyon, Temecula, Calif.

[73] Assignee: Eco-Soil Systems, Inc., San Diego, Calif.

[21] Appl. No.: 35,064

[22] Filed: Mar. 22, 1993

[51] Int. Cl.$^5$ .............................................. C02F 7/00
[52] U.S. Cl. .................................. 210/606; 210/610; 210/629; 210/747; 210/170; 210/194; 210/143; 239/61; 239/310
[58] Field of Search ............... 210/610, 611, 620, 621, 210/747, 170, 194, 220, 606, 143, 198.1, 629; 239/61, 310

[56] References Cited

U.S. PATENT DOCUMENTS

| | | | |
|---|---|---|---|
| 3,169,921 | 2/1965 | Griffith | 210/170 |
| 3,671,022 | 6/1972 | Laird et al. | 210/170 |
| 3,855,121 | 12/1974 | Gough | 210/610 |
| 3,897,000 | 7/1975 | Mandt | 210/629 |
| 3,956,124 | 5/1976 | Fast et al. | 210/629 |
| 4,611,951 | 9/1986 | Sapp | 210/747 |
| 4,713,172 | 12/1987 | Horn et al. | 210/170 |
| 4,732,682 | 3/1988 | Rymal | 210/629 |
| 5,227,067 | 7/1993 | Runyon | 210/747 |
| 5,227,068 | 7/1993 | Runyon | 210/747 |

FOREIGN PATENT DOCUMENTS 143895  9/1980  German Democratic Rep.
64-34493  2/1989  Japan.

Primary Examiner—Christopher Upton
Attorney, Agent, or Firm—Brown, Martin, Haller & McClain

[57] ABSTRACT

Apparatus is disclosed for improvement of water quality in a pond or similar body of water. A main conduit is located below the water surface and extending generally parallel to the shoreline. A plurality of distribution conduits are attached at intervals to the main conduit and operated sequentially so that water pumped through the system causes circulation of water in the pond. Each distribution conduit will preferably incorporate an aspirator to aerate the pumped water. The pumped water will also normally contain a mixture of microorganisms, enzymes and nutrients which are discharged into the body of water to clarify the body of water of contaminants and to maintain the water quality thereafter. Also disclosed is a method of improving water quality using the apparatus and the mixture. The invention provides for thorough, efficient and rapid decontamination of ponds and elimination of stagnant areas, as well as for maintaining the ponds in clean and healthy conditions. It is advantageously used for golf courses, parks and similar areas, where the treated water is to be subsequently used for irrigation of the soil and vegetation.

14 Claims, 1 Drawing Sheet

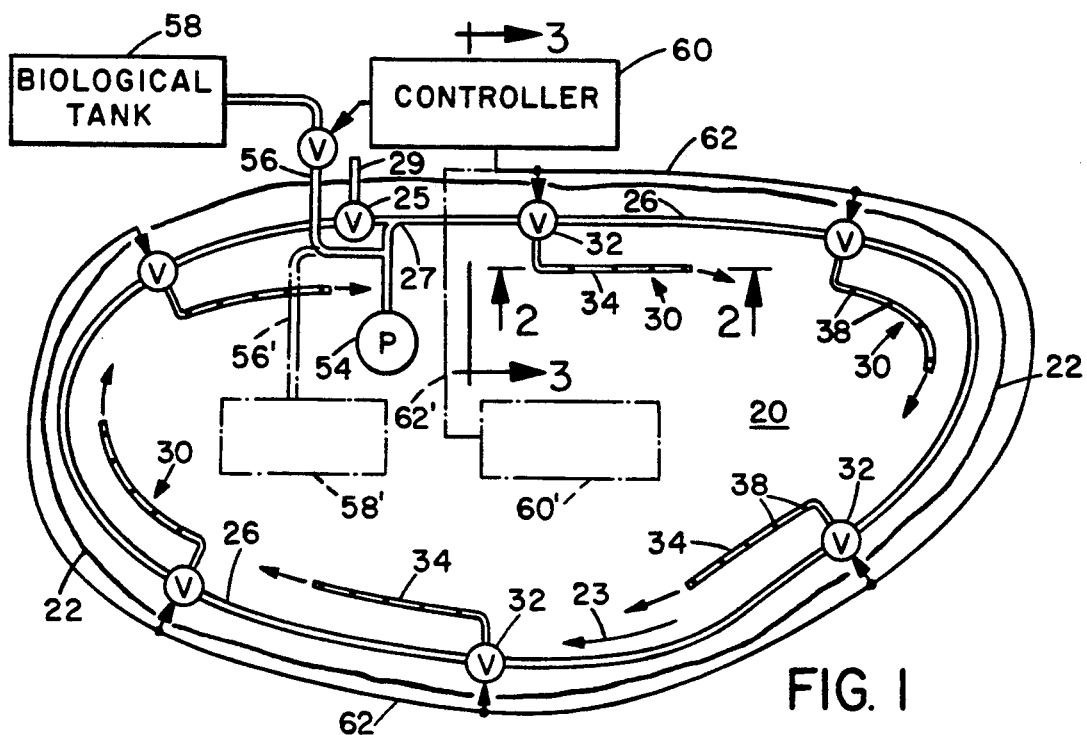
FIG. 1
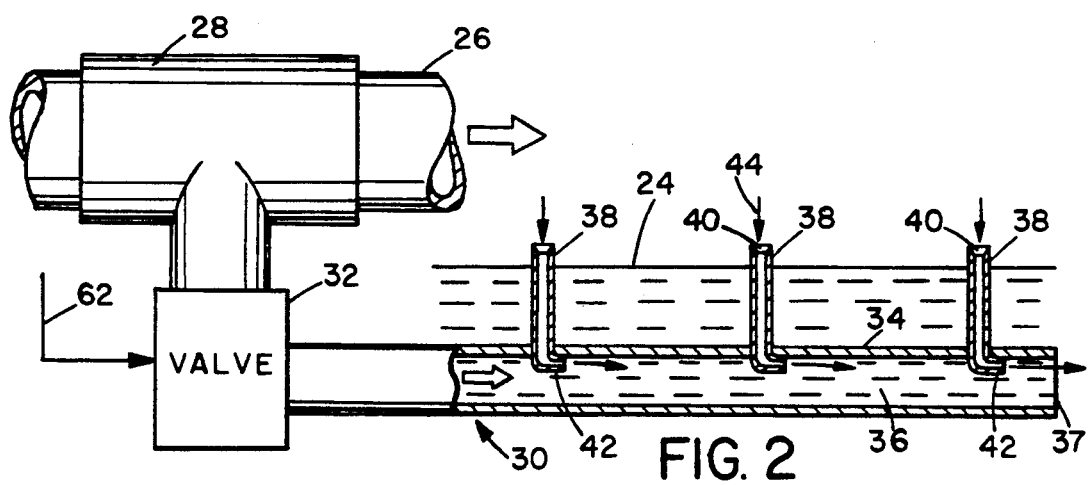
FIG. 2
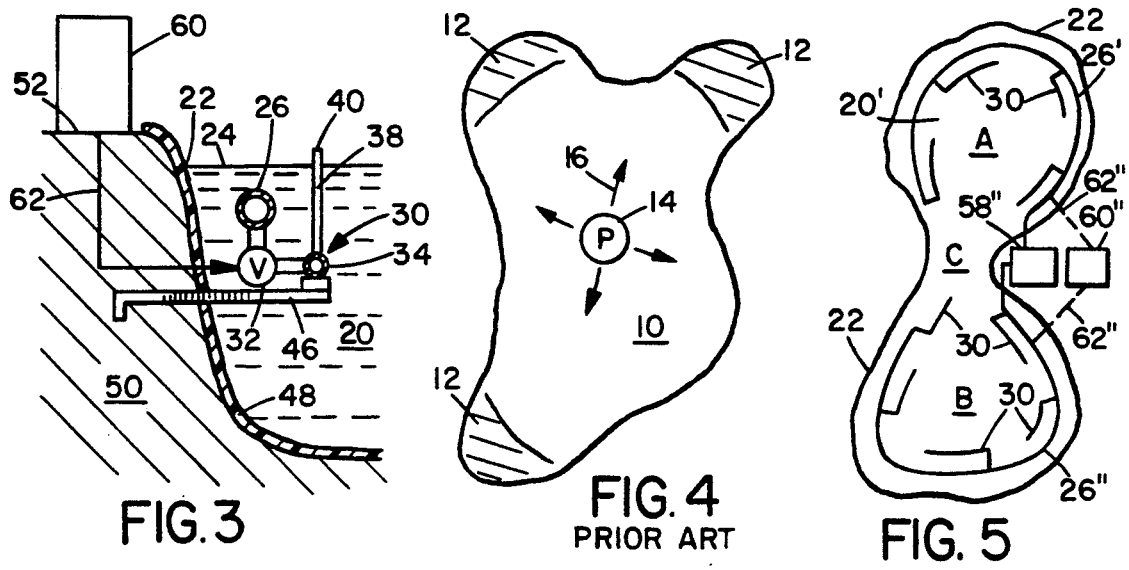
FIG. 3
FIG. 4
PRIOR ART
FIG. 5

I. METHOD AND APPARATUS FOR POND WATER CLARIFICATION AND MAINTENANCE

BACKGROUND OF THE INVENTION

1. Field of the Invention

The invention herein relates to cleaning systems for water impounded in ponds and similar reservoirs.

2. Description of the Prior Art

Many golf courses and parks contain ponds, usually artificial, which are used for the storage of irrigation water and which also provide a pleasing aesthetic effect in landscape. In the case of golf courses, such ponds also frequently serve as water hazards in the course of play. However, because most such ponds do not have a normal in-flow and out-flow pattern, it is common for the pond water to become stagnant and concentrated with various impurities such as salts, requiring frequent draining, cleaning and refilling of the ponds.

In an effort to overcome this problem, it has been common for golf course or park operators to install fountains or other similar stationary spray or aeration devices in the ponds. While these may have some modest effect on stagnation, they do not normally reach outlying areas of any but the smallest ponds nor do they reach into "pockets" or recesses along the shore line. In such recesses, the water simply eddies and stagnates. Further, the sprays and aerators have little or no effect on the concentration of salts and other impurities and contaminants.

Recently, a highly efficient irrigation system using a pond as a reservoir has been developed. This system is described and claimed in allowed U.S. patent application No. 07/782,437, now U.S. Pat. No. 5,227,067, inventor L. Runyon, assigned to Eco-Soil Systems, Inc. This system (which will be referred to in further detail below) has proved extraordinarily effective in eliminating stagnant water and in removal of contaminants from ponds at golf courses, parks and other similar settings.

However, even a superior irrigation and purification system cannot work at its maximum effectiveness if the treating materials cannot reach all parts of the pond or if the pond water does not circulate adequately to come within the system's effective range. Consequently, it would be of value to have a water circulation and purification system which would allow treatment of all water in a pond, regardless of the pond's size or shape. It would further be of value to have such a system which could cooperate synergistically with effective purification systems.

SUMMARY OF THE INVENTION

The system of the present invention effectively overcomes all of the problems of the prior art, and provides means for thorough, efficient and rapid decontamination of ponds and elimination of stagnant areas, as well as simple means for maintaining the ponds in clean and healthy conditions. It is advantageously used for golf courses, parks and similar areas, where the treated water is to be subsequently used for irrigation of the soil and vegetation.

In one broad aspect, the invention is apparatus for improvement of water quality in a body of water having a surface and a perimeter. The apparatus comprises an elongated main liquid supply conduit having an inlet and located below the surface of the body of water and extending around at least a portion of the body of water adjacent to but spaced apart from the perimeter thereof; a plurality of liquid distribution conduits attached to and in fluid communication with the main liquid supply conduit, the distribution conduits being located at spaced apart intervals along the main liquid supply conduit, each of the distribution conduits having a control valve therein adjacent its point of attachment to the main liquid supply conduit; a pump adjacent the inlet of the main supply conduit to supply liquid thereto, the liquid under the force of the pump means thereupon flowing into and through the main supply and into and through the distribution conduits; and a controller operably connected to the pump and to the valves to control the operation of the pump and to open and close each of the valves in a predetermined sequence; whereby pumped liquid flows through individual ones of the distribution conduits in the predetermined sequence and causes circulation of water in the pond. Preferably the apparatus also contains aspirators in each of the distribution conduits to aerate the pumped water, and a supply tank and conduit to permit a mixture of microorganisms, enzymes and nutrients to be incorporated into the pumped water.

In another aspect, the invention is a process for improvement of water quality in a body of water, which comprises providing a mixture of microorganisms, enzymes and nutrients therefor; incorporating the mixture into a water stream; passing the stream into a distribution system comprising a plurality of distribution conduits located at spaced apart intervals around at least a portion of the perimeter of the body of water; and causing the stream of water containing the mixture to be discharged into the body of water sequentially through individual ones of the conduits; whereby the sequential individual discharges cause water in the body to circulate and the mixture to become distributed substantially throughout the body of water, the mixture thereupon acting to clarify the body of water of contaminants contained therein and to maintain the water quality thereafter. Preferably the process also includes aerating the pumped water.

BRIEF DESCRIPTION OF THE DRAWINGS

FIG. 1 is a schematic plan view of a typical pond having a circulation and purification system of the present invention installed therein. Also illustrated are alternative locations for the biological tanks and controllers for the system.

FIG. 2 is a side elevation view taken on line 2—2 in FIG. 1 and partially in section, illustrating one of the circulation arms of the system of this invention.

FIG. 3 is a side elevation sectional view taken on line 3—3 in FIG. 1.

FIG. 4 is a schematic plan view showing a typical prior art system and illustrating how portions of the pond can remain stagnant.

FIG. 5 is a schematic plan view of a pond having a polarity of lobes with a system of the present invention installed in each lobe.

DETAILED DESCRIPTION AND PREFERRED EMBODIMENTS

Before describing the system of the current invention, reference is made to FIG. 4 which shows the typical prior art system. In this case a pond 10 is of irregular shape with portions forming pockets, coves or recesses 12 in which water circulation is restricted. While FIG. 4 shows an irregular shaped pond, it will be understood by those skilled in the art that the same effect often occurs in any type of pond whose shoreline varies significantly from a generally circular shape. Thus a pond which is square or rectangular and has sharp corners will also commonly have such recesses 12 forming in the corners thereof. Typically these prior art systems have had one or more pump driven fountains or similar aeration devices 14 located generally centrally of the pond. Such fountains draw in water from below or immediately adjacent to the fountain's pump and commonly spray it out through the fountain either omnidirectionally or through some sort of rotating spray nozzle. While this serves reasonably well to aerate water immediately adjacent to the fountain, and even at a limited distance if the pond is of a generally circular shape, the water flow created by the fountain 14 does not reach into the recesses 12. Further, the fountain spray, regardless of its effectiveness for aeration, does not significantly affect contaminate concentration in the pond.

As noted, the system of the present invention effectively overcomes all of the problems of the prior art, and provides means for thorough, efficient and rapid decontamination of ponds and elimination of stagnant areas, as well as simple means for maintaining the ponds in clean and healthy conditions.

The system is best illustrated in FIG. 1 FIG. 1 shows a pond 20 (not necessarily different from the pond 10) which has a shore line 22 where the water surface 24 meets the land 50 forming the pond shore.

Placed at a distance beneath the water surface 24 and extending generally parallel to shoreline 22 around the pond is main liquid supply pipe or conduit 26. Attached to pipe 26 at predetermined intervals, as through conventional pipe tees 28, are a plurality of circulation arms 30, each of which has a valve 32 at its inlet end. Extending outwardly from valve 32 and disposed generally parallel to shoreline 22 is circulation pipe 34, which is open at its outlet end 37 so that the liquid 36 flowing through pipe 34 discharges with its full flow into the pond 20.

Each pipe 34 has incorporated into it at least one air inlet tube 38 which extends upwardly above the water surface 24 and is open at its upper end 40 for air intake. At its lower end 42, the air intake tube 38 is curved and pointed in the down-stream direction to form an aspirator so that the flow of the liquid 36 through the pipe 34 draws in air through tubes 38 as indicated by arrows 44.

The structure may be supported in position in a variety of different ways. For instance, a plurality of struts 46 may be attached to pipes 26 and 34 and passed through pond liner 48 to be imbedded in soil 50 surrounding the pond. Alternatively, although less preferred for aesthetic reasons, a similar suspension structure may be mounted on the ground surface 52 and extended out over the water surface 24 to suspend either or both pipes 26 and 34 from above. Because of the motion of the water 36 through pipe 34, it is preferable that each circulation arm 30 be individually supported.

The water for operation of the system is preferably drawn from the pond 20 itself through pump 54. Such recycle of the water in the pond aids in the initial cleaning of the water and subsequent maintenance of the clean pond, and hastens the process of clean-up. While it would be possible to bring water in from an outside source, either through pump 54 or through a shore-based pump (not shown), that is less preferred since the pond water itself will not be cleaned as quickly and an outlet must also be provided to accommodate the additional water, so that the pond will not flood over its banks.

Pipe 26 is normally in the form of a continuous loop as shown. (It is possible, but not desirable, to terminate pipe 26 short of a complete loop, such as just upstream of valve 25 and coupling 27, but this can lead to blockage and pressure problems.) The water from pump 54 is pumped into pipe 26 though a directional coupling 27, such as a 45° lateral, so that the water circulates in the direction shown by arrow 23. Also preferably present will be clean-out valve 25 and discharge line 29. These are used periodically to divert water flow to separate refuse collection (not shown) such as a contaminant tank or sewer, so that the pipe 26 can be flushed when necessary. If valve 25 is selected to have pressure relief capabilities as well as water diversion capabilities, it can combine with line 29 also to serve as a pressure relief system to avoid build-up of excess pressure in pipe 26. Alternatively one or more separate dedicated pressure relief valves and lines could be incorporated into pipe 26.

Joining pipe 26 on the outlet side of pump 54 is line 56 which leads from reservoir tank 58 which contains the various microorganisms and nutrients which will be described below. Line 56 and biological reservoir tank 58 may be on the ground surface 52 or alternately may be submerged as shown at 56, and 58, respectively. A shore-based tank 58 is usually more readily maintained and replenished, but a submerged tank 58' would be more ascetically pleasing. Of course, if the tank is submerged as at 58', a separate supply pipe (not shown) would normally be used to replenish the biological materials in tank 58' from some point on the shore. This could be at some distance if the supply pipe were run underground to the point of insertion of the biological make-up material.

The water circulation and purification in the present system is obtained by sequentially activating each of the individual circulation arms 30 by opening and closing of the valves 32. Thus the entire fluid flow is normally passed through only a single circulation arm 30 at one time. After a predetermined interval, the valve 32 to that arm 30 will be closed and the next valve 32 to the next arm in sequence opened, and so forth. It will be understood that the sequence of arm 30 activation need not be the same as the actual sequence of the arms 30 along the pipe 26. For instance, in a six-arm system (with the arms labelled A-F in physical order) it might be desired to activate arm flow following the order of arm A, then arm C, and so on through arms E, B, D and F. The actual sequence chosen at any time will be dependent such local factors as the pond configuration, and the sequences may be varied from time to time to provide difference pond flow patterns and optimize clarification and maintenance.

The sequential operation is directed by controller 60 which sends signals through electrical line 62 to each of the valves 32 which has an electrically driven motor to open and close the valves as directed by the controller 60. Usually the sequencing is directed by appropriate software operating through some type of computer or chip, usually a microcomputer. It is preferable, but not necessary, that the control system allow for varying the sequence of arm activation, as described above. This type of valve opening and closing system is well known and need not be further discussed here. While controller 60 is shown as being land-based with line 62 running underground and through pond liner 48 into the pond at each valve, the entire system could also be submerged as shown at 60' and 62' respectively with appropriate sealing of the electronic components from the pond water.

The length and diameter of pipe 26 and the number, length and diameter of circulation arms 30 will vary depending on factors the size of the pond 20, the volume of peak flow desired, the volume of normal flow to be maintained and the size of pump 54, the desired degree of circulation and agitation to be obtained in the pond 20, the period of time over which clarification is to be accomplished, the particular configuration of the pond and the layout of the main pipe 26. Because there is increasing pressure drop with increased length of pipe and number of fittings in the pipe, as well as an economical physical size to pump 54, there will be an optimum length and diameter of pipe 26 and an optimum number, length and diameter of the circulation arms 30. Those skilled in the art will recognize that particular system to be used may be readily calculated by standard fluid flow engineering methods, from which the optimum configuration can be selected by considering such factors as the acceptable size and cost of pump 54. One comprehensive source of appropriate pipe and fitting data and flow formulas is the well-known *Chemical Engineer's Handbook* (Perry et al., eds.; various editions).

It is contemplated that many ponds will require more than one system, either because they are irregularly shaped or because they are too large for the efficient use of only a single system. For instance, in FIG. 5 the pond 20' is shown as having two lobes designated "A" and "B" separated by a narrow neck "C" through which water circulation is significantly restricted. Therefore, two separate systems using respectively pipes 26' and 26" are installed. Each could have a separate biological tank 58 and controller 60, but it is preferred where possible to use a single common biological tank 58" and controller 60" (which operates through line 62") to supply both systems. Those skilled in the art will immediately recognize this multi-lobe configuration can be extended to any number of individual systems as demanded by the size and configuration of any given pond.

The system components can be made of any conventional type of material which can be submerged in water. Thus one could use plastic pipe, stainless steel pipe, cement pipe or any other submersible type material. Similarly submersible valves and tanks are well known and one can readily select a suitable one from many commercial choices.

As noted, the system of this invention is advantageously used in cooperation with a pond water clarification system similar to that described in the Runyon application [patent]. Briefly, in that irrigation system, subsoil enhancing micro-organisms, oxygen-supplying microorganisms, enzymes and nutrients for the microorganisms are slurried and mixed with water, then passed into the pond. As applied to the present system, such microorganisms, enzymes and nutrients would be mixed and slurried in tank 58 and metered into the circulation system through valve 57 in line 56, as described above, to be circulated throughout the pond 20 or 20'.

The controller 60 will be programmed to operate the valve 57 such that the desired quantities and concentrations of microorganisms, enzymes and nutrients are provided to the pond 20. The precise amounts of each material, the time of supply to the pond 2, and the order in which each is supplied will be determined by a number of factors, including the volume of the pond 20; the specific microorganisms, enzymes and nutrients being used; the degree of clarification needed; and the specific types of contaminants involved. Park and golf course supervisors and others skilled in the art of park and course maintenance will have no difficulty determining the appropriate schedule of operation for each specific pond with no more than minimal experimentation. One can anticipate that a badly degraded irrigation pond of conventional size for a standard eighteen-hole golf course may be rejuvenated in less than 2-4 months of daily may be rejuvenated application of the system of this invention.

The various clarifying and maintenance materials which are can be used are commonly mixtures of a variety of microorganisms, and frequently are commercially sold as proprietary combinations. However, those skilled in the art will be able to determine appropriate materials by selecting those which provide the functions of oxygen-supply and salt affinity. Suitable microorganisms include thermophiles such as Archaebacteria, described in Brock et al., *Biology of Microorganisms* (5th edn., 1988) § 18.6; microorganisms which utilize hydrocarbons as nutrients, such as Pseudomonas and Mycobacterium (Brock et al., § 16.23); nitrogen fixating bacteria such as Azotobacter spp., Cynobacteria and *Bacillus polymyxa* (Brock et al., § 16.24); halophiles such as Halobacterium (Brock et al., § 19.33); Pseudomonas, Flavobacterium and Bacillus Sphaericus, described respectively at Brock et al., §§ 19.15, 19.20, and 19.26 as well as euglina spp., described in Moore et al., *Biological Science* (1963), pp. 248-249. Suitable known microbial nutrients and enzymes are exemplified by a product commercially available under the trade name "BNB-931" from Westbridge Company of Carlsbad, Calif., and a chelated product commercially available under the trade name "Sun-Up"; in this product the chelating agent is citric acid. Further details can be found in the cited Runyon application [patent].

It is anticipated that in many, if not most, cases the ponds and reservoirs in which the present system is incorporated will be used as reservoirs for irrigation water for golf courses, parks, and similar areas of soil, grass, trees, shrubs and vegetation. The clarification of the pond water and the maintenance of the improved water quality allows the golf course or park operator to provide a source of clean irrigation water. The further inclusion of the mixture of microorganisms, enzymes and nutrients allows for ongoing superior maintenance of the soil and vegetation, as described in the Runyon application [patent]. For instance, it is believes that the various microorganisms serve to destroy and eliminate the anaerobic bacteria which would otherwise accumulate in the pond water and thereafter prevent any substantial buildup of such anaerobes, and that those microorganisms which have an affinity for dissolved salts, especially sodium salts, act on such salts in the pond water and to cause a significant quantity of those salts to be converted to insoluble salts and precipitated in the pond, so that they are not drawn out with the irrigation water and distributed onto the soil and vegetation. The presence of the enzymes and nutrients allows the irrigation system to be used daily, since the microorganisms distributed to the soil and must be constantly fed in order for them to provide the ongoing and increasing enhancement of the soil and vegetation. The use of the improved and bacterial-material enhanced water on vegetation produces substantially enhanced vegetation, with improved root systems, better coverage, substantial elimination of "sterile soil" diseases, and (in the case of grass) improved resistance to abuse normal to such areas as golf courses, such as golf swings, golf carts and golf shoes. Thereafter maintenance of the improved turf, shrubbery, trees and other vegetation and soil becomes routine. It is usually found that the maintenance quantities of the microorganisms, nutrients and nutrients will be somewhat less than the quantities needed initially to correct the sterile soil and poor pond conditions. The correct quantities for each course or park at any given level of improvement or maintenance will be readily determined by the supervisors or other skilled course workers.

Further, while the above system has been described in terms of golf courses and parks, it will be evident that it has application and utility in other areas where enhancement and improvement of water quality in a pond or reservoir is desired.

It will be apparent that there are numerous embodiments of this invention which, while not expressly described above, are clearly within the scope and spirit of the invention. Therefore the above description is to be considered exemplary only, and the actual scope of the invention is to be limited solely by the appended claims.

I claim:

1. A process for improvement of water quality in a body of water, which comprises:
    providing a mixture of microorganisms, enzymes and nutrients therefor;
    incorporating said mixture into a water stream;
    passing said stream into a distribution system comprising a plurality of distribution conduits disposed at spaced apart intervals around at least a portion of the perimeter of said body of water; and
    causing said stream of water containing said mixture to be discharged into said body of water sequentially through individual ones of said conduits;
    whereby said sequential individual discharges cause water in said body to circulate and said mixture to become distributed substantially throughout said body of water, said mixture thereupon acting to clarify said body of water of contaminants contained therein and to maintain said water quality thereafter.

2. A process as in claim 1 wherein said water stream is drawn from said body of water.

3. A process as in claim 1 further comprising aerating said water stream prior to discharge into said body of water.

4. A process as in claim 1 wherein said body of water comprises a reservoir pond.

5. A process as in claim 4 wherein water from said pond after said improvement in water quality is withdrawn from said pond and used for irrigation of soil and vegetation.

6. A process as in claim 5 wherein said soil and vegetation comprise a golf course or park.

7. Apparatus for improvement of water quality in a body of water having a surface and a perimeter, which apparatus comprises:
    an elongated main liquid supply conduit having an inlet and disposed below said surface of said body of water and extending around at least a portion of said body of water adjacent to but spaced apart from said perimeter thereof;
    a plurality of liquid distribution conduits attached to and in fluid communication with said main liquid supply conduit, said distribution conduits being disposed at spaced apart intervals along said main liquid supply conduit, each of said distribution conduits having control valve means therein adjacent its point of said attachment to said main liquid supply conduit;
    pump means adjacent said inlet of said main supply conduit to supply liquid thereto, said liquid under the force of said pump means thereupon flowing into and through said main supply and into and through said distribution conduits;
    a source of microorganisms, enzymes and nutrients, and means for supplying said microorganisms, enzymes and nutrients to said pumped liquid;
    control means operably connected to said pump means and to said valve means to control the operation of said pump means and to open and close each of said valve means in a predetermined sequence; and
    whereby pumped liquid flows through individual ones of said distribution conduits in said predetermined sequence and causes circulation of water in said pond.

8. Apparatus as in claim 7 wherein said supply means comprises a supply tank in fluid communication with said main supply conduit.

9. Apparatus as in claim 8 wherein said fluid communication comprises a tank conduit from said tank to said main supply conduit, being joined to said main supply conduit at a point between said pump means and the point of attachment of said distribution conduit closest to said inlet, said tank conduit also having therein control valve means for metering said microorganisms, enzymes and nutrients into said pumped liquid.

10. Apparatus as in claim 9 wherein said metering is controlled by said control means.

11. Apparatus as in claim 7 further comprising means for aerating said pumped water.

12. Apparatus as in claim 11 wherein each of said distribution conduits contains said means for aerating.

13. Apparatus as in claim 12 wherein said means for aerating comprises an elongated aspirator tube with one end attached to and opening into said distribution conduit and the other end projecting above said surface of said body of water and being open to the atmosphere.

14. Apparatus as in claim 13 wherein each of said distribution conduits contains a plurality of said means for aerating.

* * * * *